US012600258B2

(12) United States Patent
Anand

(10) Patent No.: US 12,600,258 B2
(45) Date of Patent: Apr. 14, 2026

(54) MANAGEMENT OF CHARGING REQUESTS TO AVOID SECURITY ISSUES AND SERVICING DELAYS ACROSS CHARGING STATIONS

(71) Applicant: Honda Motor Co., Ltd., Tokyo (JP)

(72) Inventor: Geethanjali Anand, Chicago, IL (US)

(73) Assignee: Honda Motor Co., Ltd., Tokyo (JP)

( * ) Notice: Subject to any disclaimer, the term of this patent is extended or adjusted under 35 U.S.C. 154(b) by 601 days.

(21) Appl. No.: 18/169,659

(22) Filed: Feb. 15, 2023

(65) Prior Publication Data

US 2024/0270113 A1 Aug. 15, 2024

(51) Int. Cl.
*B60L 53/66* (2019.01)
*B60L 53/65* (2019.01)
*B60L 58/12* (2019.01)

(52) U.S. Cl.
CPC ............. *B60L 53/665* (2019.02); *B60L 53/65* (2019.02); *B60L 58/12* (2019.02)

(58) Field of Classification Search
CPC ........ B60L 53/665; B60L 53/65; B60L 58/12; B60L 53/67
USPC .......................................................... 320/109
See application file for complete search history.

(56) References Cited

U.S. PATENT DOCUMENTS

| | | | |
|---|---|---|---|
| 10,872,361 B2 * | 12/2020 | Khoo | G06Q 30/0283 |
| 11,225,163 B2 | 1/2022 | Yaldo et al. | |
| 11,618,330 B1 * | 4/2023 | Hau | B60L 53/36 |
| | | | 320/109 |

| | | | |
|---|---|---|---|
| 11,748,788 B2 * | 9/2023 | Khoo | G06Q 30/0283 |
| | | | 700/286 |

(Continued)

FOREIGN PATENT DOCUMENTS

| | | | | |
|---|---|---|---|---|
| CA | 2924500 C | * | 2/2024 | ............. G06Q 30/04 |
| CN | 107599851 A | | 1/2018 | |

(Continued)

OTHER PUBLICATIONS

Tools for Electric Vehicle Charging Modes, Technologies and Applications of Smart Charging. "Electric Vehicle Charging Modes, Technologies and Applications of Smart Charging"; By:Ahmad, Afaq;Khalid, Muhammad;Ullah, Zahid;+4 moreIn:Energies (19961073), Dec. 2022, vol. 15, issue 24, p. 9471 (Year: 2022).*

*Primary Examiner* — M Baye Diao
(74) *Attorney, Agent, or Firm* — Suzanne Gagnon; American Honda Motor Co., Inc.

(57) ABSTRACT

An electronic device and method for management of charging requests to avoid security issues and servicing delays across charging stations is disclosed. The electronic device receives a charging request associated with a vehicle. The charging request indicates a requirement to provide a battery charging service to the vehicle in a geographical region that includes a plurality of charging stations. The electronic device determines blocklist information that indicates ineligibility of the vehicle to receive the battery charging service from at least one charging station of the plurality of charging stations. The electronic device selects a charging station from the plurality of charging stations based on the blocklist information. The electronic device registers an order to service the charging request with the selected charging station and controls a display device to render information associated with the registration.

9 Claims, 6 Drawing Sheets

(56)                  References Cited

U.S. PATENT DOCUMENTS

| | | | |
|---|---|---|---|
| 2011/0050168 A1* | 3/2011 | Yoo | B60W 50/0097 |
| | | | 320/109 |
| 2013/0046660 A1 | 2/2013 | Lowenthal et al. | |
| 2013/0179057 A1* | 7/2013 | Fisher | B60L 53/66 |
| | | | 701/1 |
| 2014/0316939 A1* | 10/2014 | Uyeki | B60L 3/12 |
| | | | 705/26.9 |
| 2015/0226566 A1* | 8/2015 | North | G01C 21/3469 |
| | | | 701/428 |
| 2015/0306969 A1* | 10/2015 | Sabripour | B60L 53/67 |
| | | | 320/109 |
| 2015/0321570 A1* | 11/2015 | Cun | B60L 53/11 |
| | | | 320/109 |
| 2016/0176307 A1* | 6/2016 | Becker | G05B 15/02 |
| | | | 320/109 |
| 2016/0375780 A1* | 12/2016 | Penilla | B60L 53/14 |
| | | | 320/109 |
| 2018/0069406 A1* | 3/2018 | Solomon | G06F 21/31 |
| 2023/0094609 A1* | 3/2023 | Hafez | B60L 50/15 |
| | | | 320/109 |
| 2023/0105569 A1* | 4/2023 | Kostrzewski | B60L 53/305 |
| | | | 320/109 |

FOREIGN PATENT DOCUMENTS

| | | |
|---|---|---|
| CN | 105869300 B | 4/2018 |
| CN | 110481380 A | 11/2019 |
| CN | 106910284 B | 12/2019 |
| CN | 111873841 A | 11/2020 |
| CN | 112070626 B | 12/2021 |
| GB | 2587423 A | 3/2021 |
| JP | 2012182879 A | 9/2012 |
| KR | 20150048262 A | 5/2015 |
| KR | 102396445 B1 | 5/2022 |

* cited by examiner

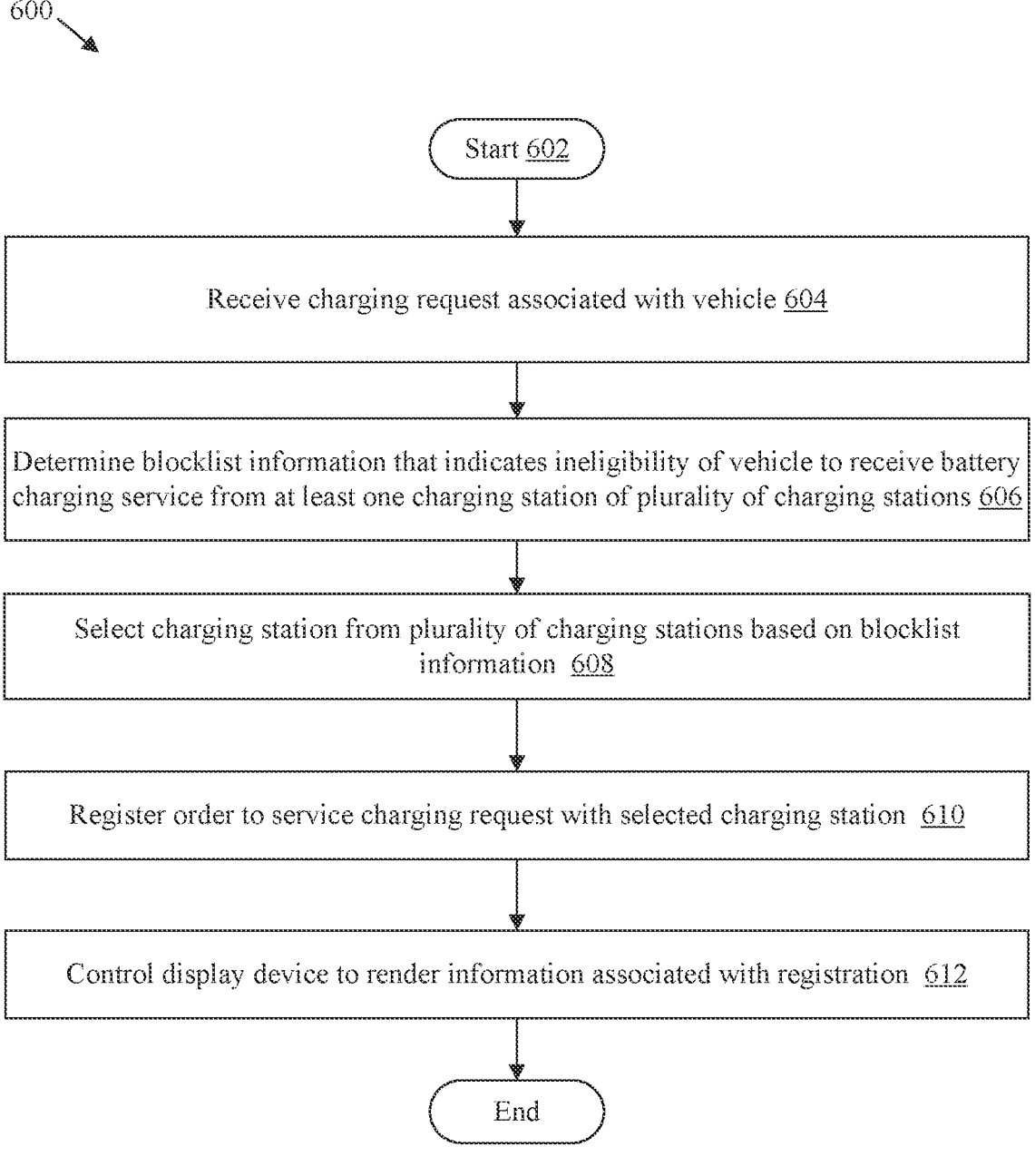

600

Start 602

Receive charging request associated with vehicle 604

Determine blocklist information that indicates ineligibility of vehicle to receive battery charging service from at least one charging station of plurality of charging stations 606

Select charging station from plurality of charging stations based on blocklist information 608

Register order to service charging request with selected charging station 610

Control display device to render information associated with registration 612

End

FIG. 6

MANAGEMENT OF CHARGING REQUESTS TO AVOID SECURITY ISSUES AND SERVICING DELAYS ACROSS CHARGING STATIONS

BACKGROUND

Improvements in electric vehicle (EV) technology have resulted in the development of a number of solutions that improve battery performance as well as on-road perfor- mance of EVs. One of the key concerns of many EV customers is limited availability of charging infrastructure. To address the concern, several individuals, particularly homeowners, have opened new charging stations or have commercialized their personal charging stations to provide charging services to individual EV users for a charge (e.g., an hourly rate in USD). Within an area, there may be numerous such stations where EV customers may charge their vehicles. In certain cases, charging station owners may favor one customer over another going by past experiences or biases. At some charging station locations, customers may face usage or parking restrictions. Before visiting a charging station, an EV customer will often check for availability for the required length. However, it may be up to station owners in residential areas to guarantee that appropriate stations are available for commercial usage. Miscommunication or a last-minute cancellation may have an impact on the cus- tomer experience. Some customers may avoid specific charging stations based on their previous booking experi- ence with such stations.

Limitations and disadvantages of conventional and tradi- tional approaches will become apparent to one of skill in the art, through comparison of described electronic devices with some aspects of the present disclosure, as set forth in the remainder of the present application and with reference to the drawings.

SUMMARY

According to an embodiment of the disclosure, an elec- tronic device for management of charging requests is dis- closed. The electronic device may include a memory storing instructions when executed by a processor cause the pro- cessor to receive a charging request associated with a vehicle. The charging request may indicate a requirement to provide a battery charging service to the vehicle in a geographical region that may include a plurality of charging stations. The processor may determine blocklist information that indicates ineligibility of the vehicle to receive the battery charging service from at least one charging station of the plurality of charging stations. The processor may select a charging station from the plurality of charging stations based on blocklist information. Thereafter, the processor may register an order to service the charging request with the selected charging station and may control a display device to render information associated with the registration.

According to another embodiment of the disclosure, a computer-implemented method for management of charging requests is disclosed. The method may include electronically receiving a charging request associated with a vehicle. The charging request may indicate a requirement to provide a battery charging service to the vehicle in a geographical region that may include a plurality of charging stations. The method may include electronically determining at least one of blocklist information or welcome-list information. The blocklist information indicates ineligibility of the vehicle to receive the battery charging service from at least one charging station of the plurality of charging stations, and the welcome-list information indicates eligibility of the vehicle to receive the battery charging service from at least another charging station of the plurality of charging stations. The method may further include electronically selecting a charg- ing station from the plurality of charging stations based on the at least one of the blocklist information or the welcome- list information. Thereafter, the method may include elec- tronically registering an order to service the charging request with the selected charging station and electronically con- trolling a display device to render information associated with the registration.

According to another embodiment of the disclosure, a non-transitory computer-readable medium is provided. The non-transitory computer-readable medium may have stored thereon computer implemented instructions that, when executed by an electronic device, causes the electronic device to execute operations. The operations may include receiving a charging request associated with a vehicle. The charging request may indicate a requirement to provide a battery charging service to the vehicle in a geographical region that includes a plurality of charging stations. The operations may include determining at least one of blocklist information or welcome-list information. The blocklist information indicates ineligibility of the vehicle to receive the battery charging service from at least one charging station of the plurality of charging stations, and the welcome list information indicates eligibility of the vehicle to receive the battery charging service from at least another charging station of the plurality of charging stations. The operations may include selecting a charging station from the plurality of charging stations based on the at least one of the blocklist information or the welcome-list information. Thereafter, the operations may include registering an order to service the charging request with the selected charging station and controlling a display device to render information associated with the registration.

BRIEF DESCRIPTION OF THE DRAWINGS

FIG. 6 is a flowchart that illustrates exemplary operations for suitable management of charging requests to avoid security issues and servicing delays across charging stations, in accordance with an embodiment of the disclosure, in accordance with an embodiment of the disclosure.

Figure 1:
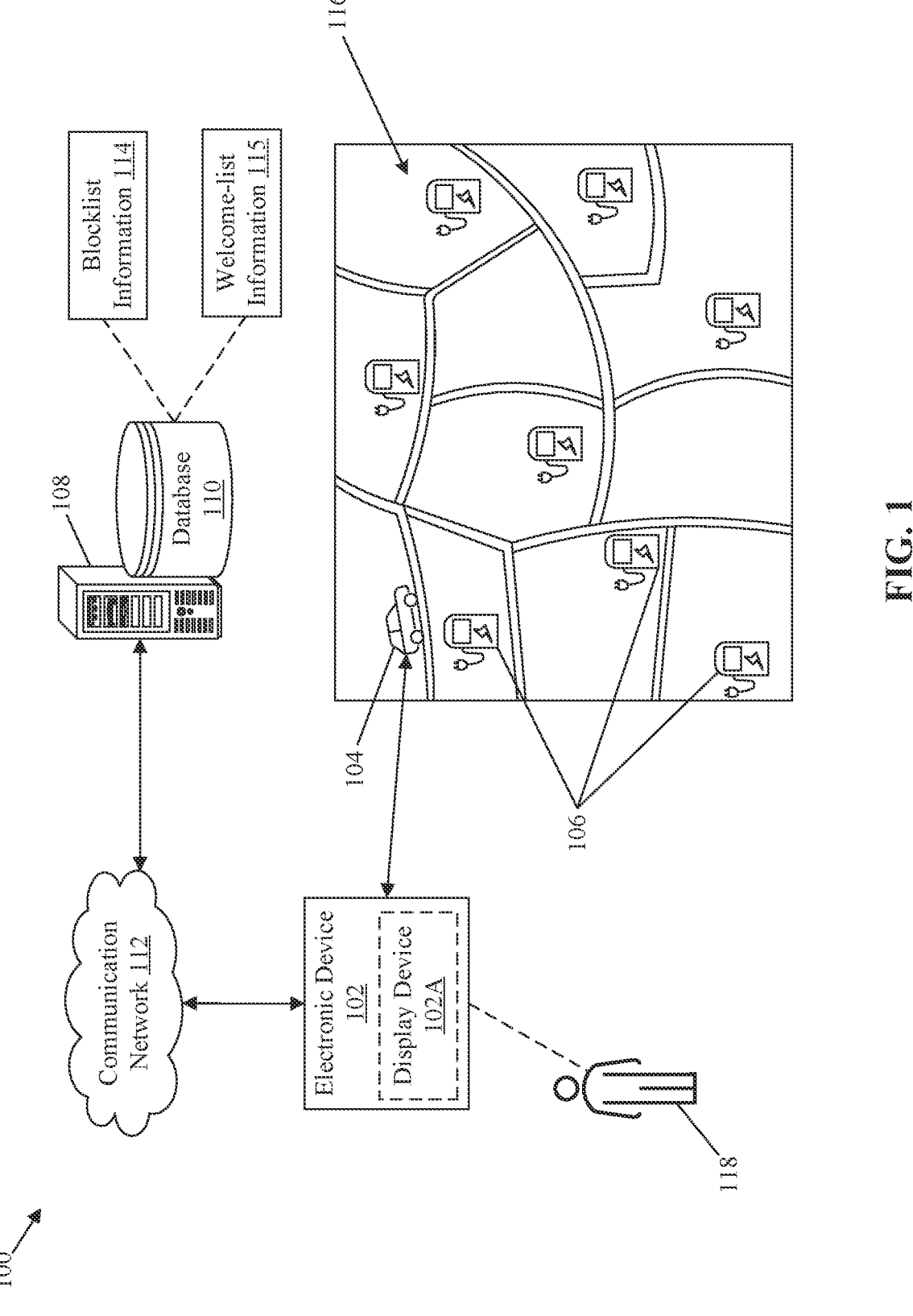
FIG. 1 is a block diagram that illustrates an exemplary network environment for suitable management of charging requests to avoid security issues and servicing delays across charging stations, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in an electronic device and method for management of charging requests to avoid security issues and servicing delays across charging stations. Exemplary aspects of the disclosure may provide an electronic device (such as a computer, a laptop, a mobile phone, a smartphone, and so on) that may be configured to receive a charging request associated with a vehicle (such as an electric car, an electric truck, an electric two-wheeler, and so on). The charging request may indicate a requirement (such as a current state of charge (SOC), a capacity of battery unit of the vehicle, a period for which vehicle requires a battery charging service, and so on) to provide a battery charging service to the vehicle in a geographical region that includes a plurality of charging stations (such as an electric vehicle supply equipment (EVSE), a level 1 charging station, a level 2 charging station, or a level 3 charging station). For the charging request, the electronic device may determine blocklist information that may indicate ineligibility of or access is denied for the vehicle to receive the battery charging service from at least one charging station of the plurality of charging stations. For example, a user of the vehicle may be ineligible to receive the battery charging service temporarily or permanently at a few charging stations. The electronic device may also determine welcome-list information that may indicate eligibility of or access is granted for the vehicle to receive the battery charging service from at least another charging station of the plurality of charging stations. For example, the user of the vehicle may be eligible to always receive the battery charging service at a few other charging stations. Based on the blocklist information and/or the welcome-list information, a charging station may be selected from the plurality of charging stations and an order to service the charging request may be registered with the selected charging station. Thereafter, a display device may be controlled to render information associated with the registration.

In some instances, charging stations may be used by owners of the charging stations for charging battery of their personal vehicle(s) or may be commercialized for charging other vehicles. Due to prior experiences or biases, some charging station owners may favor one consumer over another. Some customers may encounter use or parking limitations at some charging station locations. An electric vehicle (EV) customer will frequently check for availability for the appropriate amount of time before visiting a charging station. However, station owners in residential areas may be responsible for ensuring that adequate stations are accessible for business use. Miscommunication or a last-minute cancellation might degrade the customer experience. Some customers may avoid particular charging stations based on past reservations at such stations. For some station owners, it may be unsafe to allow strangers to use the home charging stations.

This present disclosure provides EV users with an instant booking option with security features. The user may use their application to submit a charge request. The request may be distributed to a certain geographic area. Homeowners may designate specific times that they are available for charging. A blocklist may exist to those who are not welcome to charge. A welcome-list may exist to those who are welcome to charge. Different levels of blocklists and welcome-list may exist depending on where the station is. Blocklists and welcome-lists may be based on reviews by previous homeowners who let the user charge at their house. Depending on the type of dwelling, different verifications and blocklists may exist. For example, a station at an apartment may have a different blocklist since it may be more durable than others. This disclosure may also provide a home charger to those that do not have it. A homeowner may be more likely to allow a neighbor to charge due to their familiarity with the EV user and familiarity with EV user's schedule. This disclosure may further provide an option to determine, in advance, a schedule that a homeowner may follow for charging their own vehicle(s). This may be correlated with schedules of repeat customers (i.e., EV users) to measure availability of charging stations for customers. For example, a homeowner may decide to charge every other day, while a neighbor (i.e., an EV user) may charge on opposite days.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary network environment for management of charging requests to avoid security issues and servicing delays across charging stations. With reference to FIG. 1, there is shown a network environment 100. The network environment 100 includes an electronic device 102, a vehicle 104, a plurality of charging stations 106, a server 108, a database 110, and a communication network 112. The electronic device 102, the vehicle 104, the plurality of charging stations 106, and the server 108 may communicate with each other via the communication network 112.

In the network environment, there is shown blocklist information 114, welcome-list information 115, a geographical region 116, and a user 118 of the vehicle 104. The blocklist information 114 and/or welcome-list information 115 may be associated at least one charging station of the plurality of charging stations 106. The blocklist information 114 may indicate ineligibility of or access is denied for the vehicle 104 to receive the battery charging service from the charging station. In some embodiments, the blocklist information 114 may indicate that the vehicle may be ineligible to receive the battery charging service temporarily or permanently at the charging station. The blocklist information 114 may also be known as, for example, avoid list, banned list, blacklist, or exclude-list information. The welcome-list information 115 may indicate eligibility of or access is granted for the vehicle 104 to receive the battery charging service from the charging station. In some embodiments, the welcome-list information 115 may indicate that the vehicle may be eligible to always receive the battery charging service at the charging station. The welcome-list information 115 may also be known as, for example, allow-list, include-list, prefer-list, or whitelist information.

The electronic device 102 may include suitable logic, circuitry, interfaces, and/or code that may be configured to manage bookings for a battery charging service associated with one or more vehicles in a particular geographical region (such as the geographical region 116). Examples of the electronic device 102 may include, but are not limited to, a computing device, a desktop, a personal computer, a laptop, a computer workstation, a tablet computing device, a smartphone, a cellular phone, a mobile phone, a consumer electronic (CE) device having a display, a wearable display, an in-vehicle display, or an edge device connected to a user's home network or an organization's network.

The vehicle 104 may be an electric vehicle (EV) that houses a battery unit such as a battery pack to power electrical components of the vehicle 104. The electric vehicle 104 may be a non-autonomous, a semi-autonomous, or an autonomous vehicle. The vehicle 104 may be a two-wheeler vehicle, a three-wheeler vehicle, a four-wheeler vehicle, a vehicle with any number of wheels, or a vehicle that uses one or more distinct renewable power sources such as solar power or hydrogen-based fuel. Examples of the vehicle 104 may include, but are not limited to, a hybrid electric vehicle (HEV), a battery electric vehicle (BEV), a plug-in hybrid electric vehicle (PHEV), or a vehicle with integrated photovoltaics or hydrogen fuel cells.

The plurality of charging stations 106 may be communicatively coupled to the electronic device 102. Each charging station 106 may include suitable logic, circuitry, and/or interfaces that may be configured to draw power from a conventional power source such as an electrical grid line or an alternate energy source such as a photovoltaic inverter or a fuel-based genset. The power from the power source(s) may be used to supply AC or DC current to charge the battery unit of a vehicle (such as the vehicle 104). Each charging station 106 may control, process, and/or monitor consumption of the power used in the charging of the vehicle 104. In some embodiments, each charging station may include an electronic device or database to store information associated with its past customers (i.e., vehicle users) and one or more vehicles that may have required the battery charging service. Examples of the charging station may include, but are not limited to, an electric vehicle supply equipment (EVSE), a portable charger with an energy storage unit (such as a battery or a fuel cell), a fossil-fuel based portable power generator, an AC power outlet in a residential, public, or commercial location, a Direct Current (DC) fast charging station, a home electric charging station, a level 1 charging station, a level 2 charging station, or a level 3 charging station. Each charging station may be present in a private location (such as a charging adapter located in a garage of house of owner) or a location such as a parking lot or a roadside parking space.

The server 108 may include suitable logic, circuitry, interfaces, and/or code that may be configured to receive a charging request associated with the vehicle 104 and availability information that includes a plurality of timeslots corresponding to the plurality of charging stations 106 in the geographical region 116. In accordance with an embodiment, the server 108 may route charging requests from different vehicle users to the electronic device 102. The server 108 may execute operations through web applications, cloud applications, HTTP requests, repository operations, file transfer, and the like. Example implementations of the server 108 may include, but are not limited to, a database server, a file server, a web server, an application server, a mainframe server, a cloud computing server, or a combination thereof. In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the electronic device 102 as two separate entities. In certain embodiments, the functionalities of the server 108 can be incorporated in its entirety or at least partially in the electronic device 102, without a departure from the scope of the disclosure.

The database 110 may include suitable logic, interfaces, and/or code that may be configured to store the blocklist information 114 and welcome-list information 115, the availability information that includes a plurality of timeslots corresponding to the plurality of charging stations 106, and a location associated with each charging station of the plurality of charging stations 106. The database 110 may be a relational database, a non-relational database, or a set of files in conventional or big-data storage. In an embodiment, the database 110 may be stored or cached on a device, such as the server 108. In some embodiments, the database 110 may be hosted on a plurality of servers at same or different locations. Operations of the database 110 may be executed using hardware including a processor, a microprocessor (e.g., to perform or control performance of one or more operations), a field-programmable gate array (FPGA), or an application-specific integrated circuit (ASIC). In some other instances, the database 110 may be implemented using software.

In an embodiment, the device storing the database 110 may be configured to receive a query for the blocklist information 114 from the electronic device 102. In response to the received query, the device storing the database 110 may retrieve the blocklist information 114 and may provide the retrieved blocklist information 114 to the electronic device 102. In another embodiment, the device storing the database 110 may be configured to receive a query for the welcome-list information 115 from the electronic device 102. In response to the received query, the device storing the database 110 may retrieve the welcome-list information 115 and may provide the retrieved welcome-list information 115 to the electronic device 102. In other embodiments, the device storing the database 110 may be configured to receive a query for the blocklist information 114 and welcome-list information 115 from the electronic device 102. In response to the received query, the device storing the database 110 may retrieve the blocklist information 114 and welcome-list information 115 and may provide the retrieved blocklist information 114 and welcome-list information 115 to the electronic device 102.

The communication network 112 may include a communication medium through which the electronic device 102 and the server 108 may communicate with each other. The communication network 112 may include one of a wired connection or a wireless connection. Examples of the communication network 112 may include, but are not limited to, the Internet, a cloud network, a Cellular or Wireless Mobile Network (such as a Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

During operation, the electronic device 102 may receive a charging request associated with the vehicle 104 (such as an electric car, an electric truck, or an electric scooter). The charging request may indicate a requirement to provide a battery charging service to the vehicle 104 in the geographical region 116 that includes the plurality of charging stations 106. By way of example, and not limitation, the requirement may include at least one of a current state of charge (SOC) of the vehicle 104, a capacity of battery unit of the vehicle 104, a period for which vehicle 104 requires the battery charging service, a type of the battery charging service that is required for the vehicle 104, and the like. The type of the battery charging service may include a fast-charging service, a trickle charging service, an alternating current (AC) charging service, or a direct current (DC) charging service. The charging request may further include vehicle information associated with the vehicle 104. The vehicle information may include a vehicle registration number, a current location of the vehicle 104, or user information associated with the user 118 of the vehicle 104.

After receiving the charging request, the electronic device 102 may determine the blocklist information 114 and/or welcome-list information 115 for the vehicle 104. In accordance with an embodiment, a separate blocklist (i.e., an instance of the blocklist information 114) and/or a separate welcome-list (i.e., an instance of the welcome-list information 115) may be exist for each charging station of the plurality of charging stations 106. The blocklist information 114 may indicate ineligibility of or access is denied for the vehicle 104 to receive the battery charging service from at least one charging station of the plurality of charging stations 106. The welcome-list information 115 may indicate eligibility of or access is granted for the vehicle 104 to receive the battery charging service from at least another charging station of the plurality of charging stations 106.

In accordance with an embodiment, the blocklist information 114 and welcome-list information 115 may be determined based on ratings received from owners of the plurality of charging stations 106. A rating may be provided to the user 118 of the vehicle 104 for a set of past visits to at least one charging station of the plurality of charging stations 106. For example, the owner of a charging station (where the vehicle 104 may have received the battery charging service) may be asked to provide a rating to the user 118 of the vehicle 104, and the rating will be compared to a threshold rating. In one embodiment, if the rating of the user 118 is equal to or below a low threshold rating (e.g., a first threshold rating), then details of the user 118 may be added to the blocklist information 114. In another embodiment, if the rating of the user 118 is equal to or above a high threshold rating (e.g., a second threshold rating), then the details of the user 118 may be added to the welcome-list information 115. In other embodiments, if the rating of the user 118 is above the low threshold rating but below the high threshold rating, then the details of the user 118 may be added temporarily to the blocklist information 114. The user 118 may be temporarily listed as blocked until unblocked, for example, by answering predetermined questions or sending a request to the charging station owner. Temporary blocklist information 114 may also be known as, for example, delaylist, greylist or pending-list information.

The blocklist information 114 and welcome-list 115 may be updated frequently after each instance of the battery charging service, and when a battery charging request is raised by the user 118 of the vehicle 104, the electronic device 102 may determine a location of the vehicle 104 in the geographic region 116. Based on the determined location of the vehicle 104, the electronic device 102 may compare the vehicle information with information associated with the plurality of charging station 106 in the geographical region 116. Based on the comparison, the blocklist information 114 and/or welcome-list 115 associated with the vehicle 104 may be determined. The electronic device 102 may control a display device 102A to render information associated with the blocklist information 114 and/or the welcome-list information 115. An example of the rendered information is provided in FIG. 4A, for example.

The electronic device 102 may further receive availability information associated with the plurality of the charging stations 106 based on the location of the vehicle 104. The availability information may include a plurality of timeslots corresponding the plurality of the charging stations 106 in the geographical region 116. Each timeslot of the plurality of timeslots may indicate a period in which a particular charging station is available for servicing one or more charging requests. Based on the received availability information and the blocklist information 114 and/or welcome-list information 115, the electronic device 102 may select a charging station from the plurality of charging stations 106. Further, the electronic device 102 may register an order to service the charging request with the selected charging station. The selected charging station may be different from at least one charging station, from which the vehicle 104 is ineligible to receive the battery charging service. The electronic device 102 may control a display device 102A to render information associated with the registration. An example of the rendered information is provided in FIG. 4B, for example.

Figure 2:
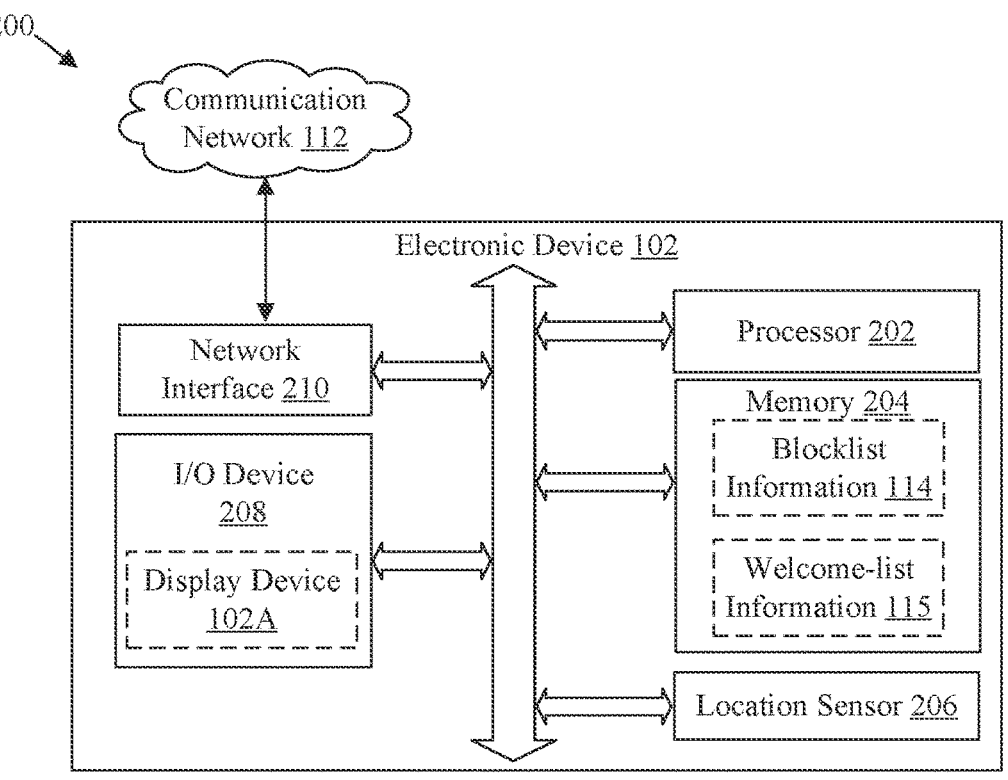
FIG. 2 is a block diagram that illustrates an exemplary electronic device of FIG. 1, in accordance with an embodi- ment of the disclosure.

FIG. 2 is a block diagram that illustrates an exemplary electronic device of FIG. 1. FIG. 2 is explained in conjunction with elements from FIG. 1. With reference to FIG. 2, there is shown a block diagram 200 of the electronic device 102. The electronic device 102 may include processor 202, a memory 204, a location sensor 206, an input/output (I/O) device 208, a display device 102A, and a network interface 210. In at least one embodiment, the I/O device 208 may also include the display device 102A. In at least one embodiment, the memory 204 may also include the blocklist information 114 and/or welcome-list information 115. The processor 202 may be communicatively coupled to the memory 204, the location sensor 206, the I/O device 208, and the network interface 210 through wired or wireless communication of the electronic device 102. A person of ordinary skill in the art will understand that the block diagram 200 of the electronic device 102 may also include other suitable components or systems, in addition to the components or systems which are illustrated herein to describe and explain the function and operation of the present disclosure. Detailed description of such components or systems has been omitted from the disclosure for the sake of brevity.

The processor 202 may include suitable logic, circuitry, and/or interfaces code that may be configured to execute program instructions associated with different operations to be executed by the electronic device 102. The processor 202 may include one or more specialized processing units, which may be implemented as a separate processor. In an embodiment, the one or more specialized processing units may be implemented as an integrated processor or a cluster of processors that perform the functions of the one or more specialized processing units, collectively. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Examples of the processor 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors. The functions or operations executed by the electronic device 102, as described in FIG. 1, may be performed by the processor 202. Operations executed by the processor 202 are described in detail, for example, in FIG. 4.

The memory 204 may include suitable logic, circuitry, interfaces, and/or code that may be configured to store the program instructions executable by the processor 202. In at least one embodiment, the memory 204 may be configured to store the blocklist information 114 and/or the welcome-list information 115. The memory 204 may further store information related to a location of each charging station of the plurality of charging stations 106. The memory 204 may be a persistent storage medium, a non-persistent storage medium, or a combination thereof. Example implementations of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The location sensor 206 may include suitable logic, circuitry, and/or interfaces that may be configured to determine a current geo-location of the vehicle 104. The location sensor 206 may be further configured to transmit information related to the sensed geo location (e.g., geo-location co-ordinate data) to the processor 202 for determination of the current location of the vehicle 104. Examples of the location sensor 206, may include, but are not limited to, a Global Navigation Satellite System (GNSS)-based sensor of the vehicle 104. Examples of the GNSS-based sensor may include, but are not limited to, global positioning sensor (GPS), Global Navigation Satellite System (GLONASS), or other regional navigation systems or sensors.

The I/O device 208 may include the display device 102A. The display device 102A may include suitable logic, circuitry, and interfaces that may be configured to receive inputs from the processor 202 to render, on a display screen, information associated with the registration of an order for a charging request to provide a battery charging service to the vehicle 104. In at least one embodiment, the user 118 input may be received for raising the battery charge request for the vehicle 104. In at least one embodiment, the user 118 input may be received for selection of at least one charging station from the plurality of charging stations 106 for the battery charging request. The display device 102A may be a touch screen which may enable the user 118 to provide a user-input via the display device 102A. The touch screen may be at least one of a resistive touch screen, a capacitive touch screen, or a thermal touch screen. The display device 102A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 102A may refer to a display screen of the smartphone, the computer workstation, the handheld computer, the cellular/mobile phone, the portable consumer electronic (CE) device, a smart-glass device, a see-through display, a projection-based display, an electro-chromic display, or a transparent display.

The network interface 210 may include suitable logic, circuitry, and interfaces that may be configured to facilitate communication between the electronic device 102, and the server 108 via the communication network 112. The network interface 210 may be implemented by use of various known technologies to support wired or wireless communication of the server 108 with the communication network 112. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, a wireless pear-to-pear protocol, a protocol for email, instant messaging, and a Short Message Service (SMS).

Figure 3:
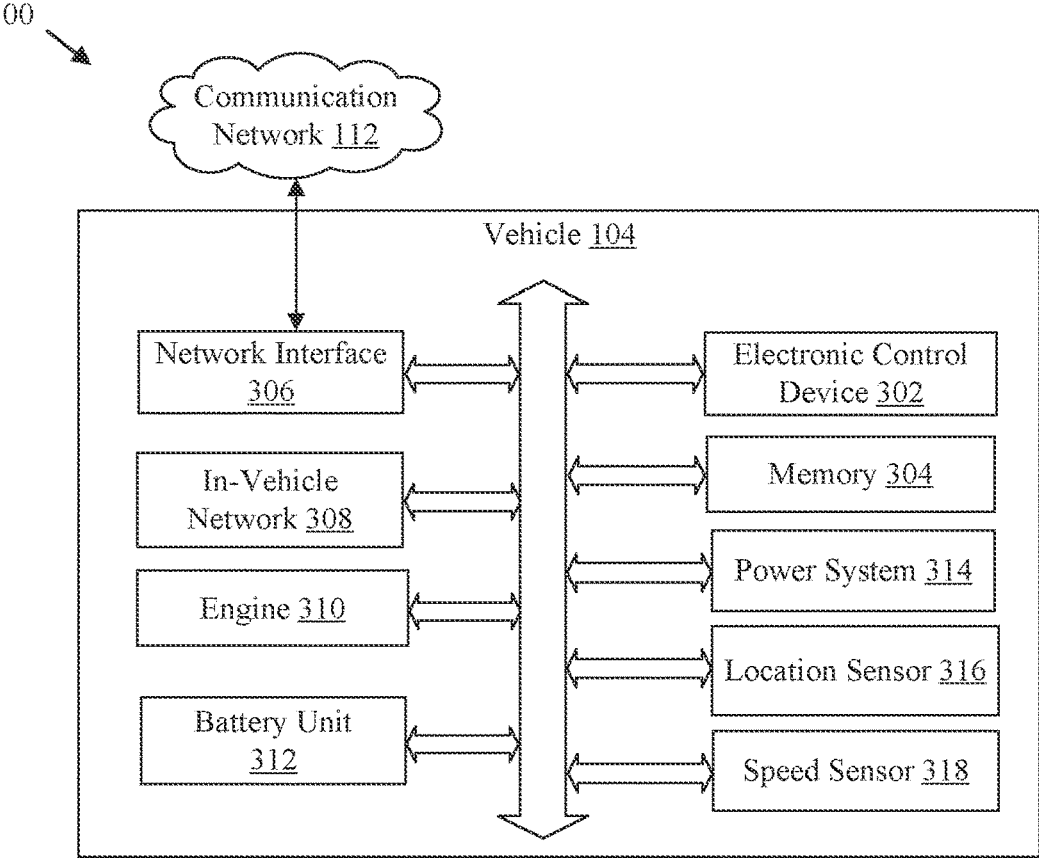
FIG. 3 is a block diagram that illustrates an exemplary vehicle of FIG. 1, in accordance with an embodiment of the disclosure.

FIG. 3 is a block diagram that illustrates an exemplary vehicle of FIG. 1. FIG. 3 is explained in conjunction with elements from FIG. 1 and FIG. 2. With reference to FIG. 3, there is shown a block diagram 300 of the vehicle 104. The vehicle 104 may include an electronic control device 302, a memory 304, a network interface 306, an in-vehicle network 308, an engine 310, a battery unit 312, a power system 314, a location sensor 316, and a speed sensor 318.

The electronic control device 302 may include suitable logic, circuitry, interfaces, and/or code that may be configured to monitor a usage of the vehicle 104. The electronic control device 302 may be a specialized electronic circuitry that may include an electronic control unit (ECU) processor to control different functions, such as, but not limited to, engine and battery operations, communication operations, and data acquisition of the vehicle 104. The electronic control device 302 may store information associated with the vehicle 104 and may transmit such information to the electronic device 102 based on requirements. In an embodiment, the electronic control device 302 may determine usage statistics associated with the battery unit 312 of the vehicle 104. One example implementation of the electronic control device 302 can be a microprocessor. Other examples of the electronic control device 302 may include, but are not limited to, a vehicle control system, an in-vehicle infotainment (IVI) system, an automotive Head-up Display (HUD), an automotive dashboard, an embedded device, a smartphone, a human-machine interface (HMI), a computer workstation, a handheld computer, a cellular/mobile phone, a portable CE device, a server, and other computing devices.

The memory 304 may include suitable logic, circuitry, interfaces, and/or code that may be configured to store a set of instructions executable by the electronic control device 302. The set of instructions may be executed by the electronic control device 302 to perform operations of the electronic control device 302. In at least one embodiment, the memory 304 may be configured to store the information associated with the vehicle 104 and usage statistics associated with the battery unit 312 of the vehicle 104. The memory 304 may be a persistent storage medium, a non-persistent storage medium, or a combination thereof. Examples of implementation of the memory 304 may include, but are not limited to, RAM, ROM, a HDD, an SSD, a CPU cache, and/or a SD card.

The network interface 306 may include suitable logic, circuitry, and interfaces that may be configured to facilitate communication between the electronic control device 302 and the various devices or components of the network environment 100 (such as, the electronic device 102 and/or the server 108), via the communication network 112. The network interface 306 may be implemented by use of various known technologies to support wired or wireless communication of the vehicle 104 with the communication network 112. The network interface 306 may include, but is not limited to, an antenna, a RF transceiver, one or more amplifiers, a tuner, one or more oscillators, a digital signal processor, a CODEC chipset, a SIM card, or a local buffer circuitry. The network interface 306 may be configured to communicate via wireless communication with networks, such as the Internet, an Intranet, or a wireless network, such as a cellular telephone network, a wireless LAN, and a MAN. The wireless communication may be configured to use one or more of a plurality of communication standards, protocols, and technologies, such as GSM, EDGE, W-CDMA, LTE, 5G NR, CDMA, TDMA, Bluetooth, Wi-Fi (such as IEEE 802.11a, IEEE 802.11b, IEEE 802.11g or IEEE 802.11n), VoIP, Li-Fi, Wi-MAX, a protocol for email, instant messaging, and a SMS.

The in-vehicle network 308 may include a medium through which the electronic control device 302, the memory 304, the engine 310, the battery unit 312, the power system 314, and the location sensor 316 may communicate with each other. In accordance with an embodiment, in-vehicle communication of audio/video data may occur by use of Media Oriented Systems Transport (MOST) multimedia network protocol of the in-vehicle network 308 or other suitable network protocols for vehicle communication. The MOST-based network may be a separate network from the controller area network (CAN). The MOST-based network may use a plastic optical fiber (POF) medium. In accordance with an embodiment, the MOST-based network, the CAN, and other in-vehicle networks may co-exist in a vehicle, such as the vehicle 104. The in-vehicle network 308 may facilitate access control and/or communication between the electronic control device 302 and other ECUs, such as ECM or a telematics control unit of the vehicle 104.

Various devices or components in the vehicle 104 may connect to the in-vehicle network 308, in accordance with various wired and wireless communication protocols. Examples of the wired and wireless communication protocols for the in-vehicle network 308 may include, but are not limited to, cellular Vehicle-to-Everything (C-V2X) communication, Dedicated Short-Range Communication (DSRC), a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit (I²C), Inter Equipment Bus (IEBus), Society of Automotive Engineers (SAE) J1708, SAE J1939, International Organization for Standardization (ISO) 11992, ISO 11783, MOST, MOST25, MOST50, MOST150, Plastic optical fiber (POF), Power-line communication (PLC), Serial Peripheral Interface (SPI) bus, and/or Local Interconnect Network (LIN).

The engine 310 may operate only on stored electricity and may include one or more electric motors (either alternating current [AC] or direct current [DC]), and a controller to manage the power electronics. Compared with ICEs, which deliver their peak torque within a limited range of engine rpm, the electric motor can deliver a constant and high torque over a broad range of speeds from zero mph; thus, most EVs neither need a reduction gearbox nor do they require the increasingly complex engine management systems that have been added to ICEs and their transmissions to comply with emissions legislation while retaining drivability. As a result, the complete EV drivetrain may be less complex compared to conventional vehicles with ICE. A description of various parts of the engine 310 has been omitted from the disclosure for the sake of brevity.

The battery unit 312 may be a source of electric power for one or more electric circuits or loads in the vehicle 104. For example, the battery unit 312 may be a source of electrical power to the electronic control device 302, the memory 304, the network interface 306, in-vehicle network 308, the engine 310, the power system 314, the location sensor 316, and the speed sensor 318. The battery unit 312 may correspond to a battery pack that includes a specific arrangement of multiple batteries. Such batteries are typically surrounded by a suitable coolant and a charge controller. Examples of the battery unit 312 may include, but are not limited to, a lead acid battery, a nickel cadmium battery, a nickel-metal hydride battery, a lithium-ion battery, a sodium ion battery, and other forms of rechargeable batteries.

The power system 314 may include suitable logic, circuitry, interfaces, and/or code that may be configured to control output of electric power to various electric circuits and loads of the vehicle 104. The power system 314 may utilize the battery to provide the electric power to perform various electrical operations of the vehicle 104. The power system 314 may provide the electric power for functioning of different components (such as the electronic control device 302, the memory 304, the network interface 306, the in-vehicle network 308, the engine 310, the power system 314, the location sensor 316, and the speed sensor 318) of the vehicle 104. In some instances, the power system 314 may be configured to receive control signals from the electronic control device 302 to control the various electric circuits and loads of the vehicle 104. The power system 314 may be configured to control the charging and the discharging of the battery unit 312 based on the received control signals. Examples of the power controller may include, but are not limited to, an electric charge/discharge controller, a charge regulator, a battery regulator, a battery management system, an electric circuit breaker, a power electronic drive control system, an Application-Specific Integrated Circuit (ASIC) processor, and/or other power-control hardware processors.

The location sensor 316 may include suitable logic, circuitry, and/or interfaces that may be configured to determine a current geo-location of the vehicle 104. Examples of the location sensor 316, may include, but are not limited to, a Global Navigation Satellite System (GNSS)-based sensor of the vehicle 104. Examples of the GNSS-based sensor may include, but are not limited to, global positioning sensor (GPS), Global Navigation Satellite System (GLONASS), or other regional navigation systems or sensors.

The speed sensor 318 may include suitable logic, circuitry, interfaces, and/or code that may estimate a speed of the vehicle 104 in a direction of the motion of the vehicle 104. The speed may be determined based on a linear displacement of the vehicle 104 or an angular displacement of a front wheel of the vehicle 104. Example of the speed sensor 318 may include, but are not limited to, Hall effect sensors, variable reluctance speed sensors, Radio Frequency (RF) speed sensors, amplified (Active) speed sensors, Light Detection and Ranging (LiDAR) speed sensors, accelerometer-based speed sensors, optical speed sensors, and Antilock Braking System (ABS) speed sensors. In some embodiments, the speed sensor 318 may detect the speed based on engine revolutions, gear ratio, wheel rotation, and the like.

Figure 4A:
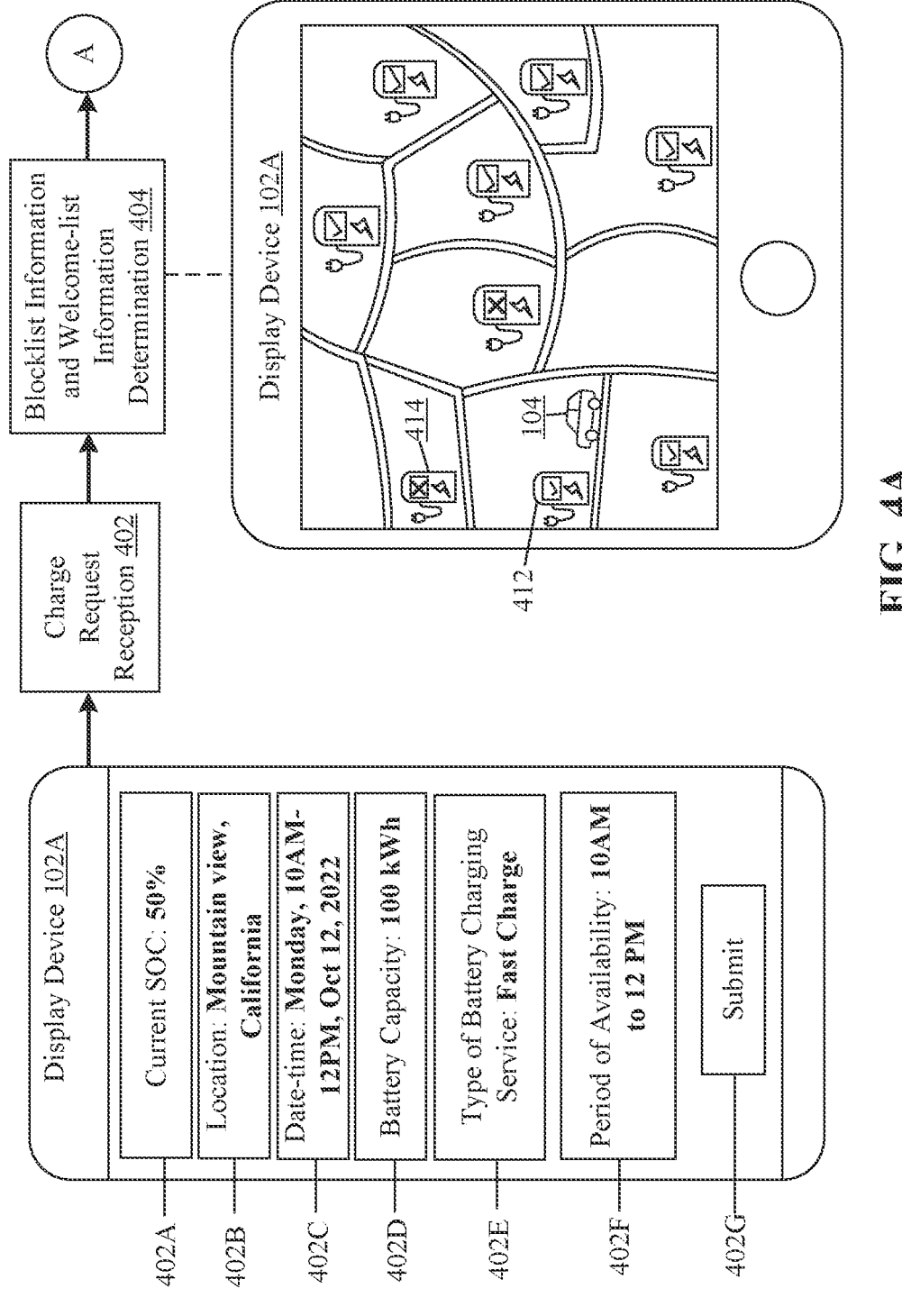
FIGS. 4A and 4B are diagrams that illustrate exemplary execution flow for suitable management of charging requests to avoid security issues and servicing delays across charging stations, in accordance with an embodiment of the disclosure.
Figure 4B:
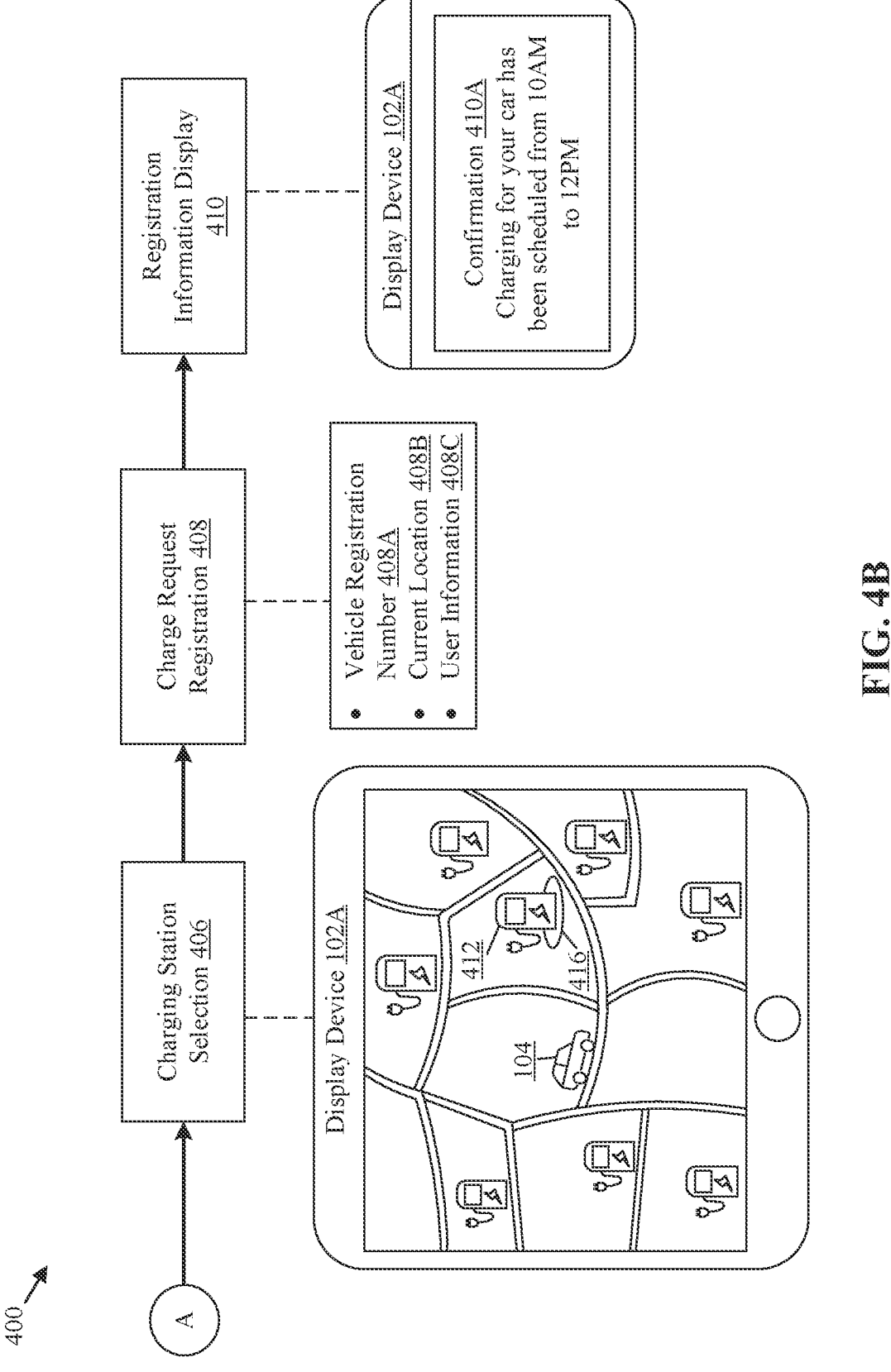

FIGS. 4A and 4B are diagrams that illustrate an exemplary execution flow for management of charging requests to avoid security issues and servicing delays across charging stations. FIGS. 4A and 4B are explained in conjunction with elements from FIG. 1, FIG. 2, and FIG. 3. With reference to FIGS. 4A and 4B, there is shown an exemplary flow 400 of operations from 402 to 410, as described herein.

At 402, a charging request may be received. The processor 202 may receive a charging request associated with the vehicle 104. The charging request may be received from a user device associated with the user 118 or from an in-vehicle display of the vehicle 104. For example, a vehicle (such as EV) may require a battery charging service as SOC of the vehicle's battery may be below a required level (e.g., 10%). Based on the requirement, the user 118 of the vehicle 104 may raise a charging request for charging the battery via a user interface (as shown in FIG. 4A) of the display device 102A. As illustrated in FIG. 4A, after vehicle and charging details (i.e., 402A-402F) are provided, the user 118 may select a submit option 402G to initiate the request for the battery charging service.

The charging request may indicate a requirement to provide a battery charging service to the vehicle 104 in the geographical region 116. The requirement for the battery charging service may include at least one of a current SOC of the vehicle 104, a period for which the vehicle 104 requires the battery charging service, a capacity of a battery unit of the vehicle 104, a type of the battery charging service (e.g., a regular charge service or a fast charge service) that is required for the vehicle 104, and a period of availability for which the vehicle 104 requires the battery charging service, and the like. As shown, for example, a current SOC 402A of the battery may be 50%, a capacity 402D of the battery unit may be 100 kWh, a type of the battery charging service 402E (e.g., a service selected by the user 118) may be a fast charge service, and a period of availability 402F for which the vehicle 104 requires the battery charging service may be 10 AM to 12 PM. In accordance with an embodiment, the requirement for the battery charging service may further include date-time information 402C to indicate a period for which the battery charging service is required. The date-time information 402C may include a date (e.g., Oct. 17, 2022), a day of the week (e.g., Monday), or a desired timeslot (e.g., 10 AM to 12 PM) for availing the battery charging service. Additionally, or alternatively, the requirement may specify a date-time of creation of the charging request (e.g., Dec. 14, 2022, 1500 hours).

In accordance with an embodiment, the charging request may include vehicle information associated with the vehicle 104. The vehicle information may include, for example, at least one of a vehicle registration number, a current location 402B of the vehicle 104, and user information associated with the user 118 of the vehicle 104, and the like. The user information may include, for example, user's name, user's age, user's gender, user's mobile phone number, and user's unique identification number, and the like. The location 402B of the vehicle 104 may be a physical location with coordinates that may be updated periodically. For example, a location sensor such as the location sensor 206 or the location sensor 316 may determine the location 402B of the vehicle 104 at periodic time intervals (e.g., every ten seconds).

Based on the geographical region 116 and the charging request, it may be necessary to determine the availability of each charging station in the geographical region 116. The determination may help to filter out one or more charging stations that do not satisfy the requirement indicated in the charging request. The processor 202 may receive the availability information from the server 108 or the plurality of charging stations 106. The availability information may include a plurality of timeslots corresponding to the plurality of charging stations 106. Each timeslot may indicate a period for which a corresponding charging station of the plurality of charging stations 106 is available to service one or more charging requests. In an embodiment, the availability information may be received periodically at predefined time intervals (e.g., after every 30 minutes).

At 404, the blocklist information 114 may be determined. The processor 202 may determine the blocklist information 114 based on the charging request. The blocklist information 114 may indicate an ineligibility of or access is denied for the vehicle 104 to receive the battery charging service from at least one charging station of the plurality of charging stations 106. Additionally, or alternatively, the processor 202 may determine the welcome-list information 115 based on the charging request. The welcome-list information 115 may indicate an eligibility of or access is granted for the vehicle 104 to receive the battery charging service from at least another charging station of the plurality of charging stations 106.

In an embodiment, the processor 202 may control the display device 102A to render the information associate with the determined blocklist information 114 and/or the welcome-list information 115. In accordance with an embodiment, the blocklist information 114 and/or welcome-list information 115 may include an identifier of the user 118 or the vehicle 104. One or more labels may be mapped to the identifier to indicate whether the user 118 or the vehicle 104 is in a blocklist of a charging station or a welcome-list of the charging station. Users or vehicles in the blocklist of a charging station may not be allowed to book a visit to that station. Users or vehicles in the welcome-list of a charging station may be allowed to book a visit to that station. For example, if the user 118 or the vehicle 104 is in the blocklist of the charging station, a blocklist charging station icon 414 may be identified by a marked out symbol. If the user 118 or the vehicle 104 is in the welcome-list of the charging station, a welcome-list charging station icon 412 may be identified by a checked symbol. In other embodiments, other indicators such as, for example, different icons, highlighting, sizing, colors, or symbols may be used to indicate a blocklist charging station or a welcome-list charging station.

Additionally, or alternatively, the blocklist information 114 may include one or more property-specific rules to prevent specific users or specific vehicles from booking a visit to the charging station inside the property. For example, a property-specific rule may only allow private EV owners to book the battery charging service at the charging station and may not allow commercial EV owners to book the battery charging service at the charging station. Another property-specific rule may only allow EV owners who may be residing in a particular region (such as a city, a town, a block, or a state) to book the battery charging service at the charging station. Another property-specific rule may require EV owners to have a social relationship with the owner or operator of the charging station for booking the battery charging service at the charging station. Another property-specific rule may require EV owners to reside within a threshold radius from the location of the charging station for booking the battery charging service at the charging station. Another property-specific rule may require EV owners to have a subscription or an association with a particular product or brand for booking the battery charging service at the charging station.

In accordance with an embodiment, the processor 202 may acquire information (i.e., first information) about a location associated with each charging station of the plurality of charging stations 106. The first information may be acquired from the server 108 or devices associated with each charging station of the plurality of charging stations 106. The blocklist information 114 may be determined further based on the acquired first information. The first information may indicate, for example, a type of the location (such as a commercial complex, a residential complex, or a public space) and at least one restriction (such as a restriction to only permit residents of a property to use the charging stations) associated with the location. For example, certain locations such as residential complexes may have certain restrictions specific to the charging stations located inside the residential complexes (e.g., apartments, cooperatives, condominiums, townhomes, multi-family housing, or sub-division). As an example, a restriction may only allow residents of the residential complex to book the battery charging service at a charging station inside the residential complex. The restriction may not allow outsiders (i.e., non-residents) to book the battery charging service at the charging station.

In accordance with an embodiment, the processor 202 may acquire information (i.e., second information) from the server 108 or devices associated with each charging station of the plurality of charging stations 106. The second information may indicate a rating associated with the user 118 of the vehicle 104 for a set of past visits to at least one charging station. The blocklist information 114 may be determined further based on whether the rating is equal to or below a low threshold rating. The welcome-list information 115 may be determined further based on whether the rating is equal to or above a high threshold rating. For example, after completion of a battery charging request at charging station, the owner of the charging station may be required to provide a rating to the user 118 of the vehicle 104. In accordance with an embodiment, the processor 202 may determine the overall rating based on inputs from the owner or operator of the charging station. For example, the inputs may include scores for behavioral indicators (e.g., a politeness indicator, a respect indicator, a discipline indicator, and the like) of the user 118 for a duration of stay at the charging station. Additionally, or alternatively, the inputs may include an indicator of on-time payment for the battery charging service, an indicator of on-time arrival at a schedule time for availing the battery charging service at the charging station, an indicator for any damage or unauthorized use of items inside a property of the owner or operator of the charging station, an indicator for bringing or using prohibited items (such as cigarettes, drugs, or weapons) inside the property of the owner or the operator of the charging station, and the like. An example of the second information is described further, for example, in FIG. 5.

At 406, a charging station 416 may be selected. Based on the availability information of the plurality of the charging stations 106 and the requirement indicated in the charging request, a set of charging stations may be selected. For example, a battery charging request from 1 PM to 5 PM may be raised by the user 118 of the vehicle 104. Based on the location of the vehicle 104, the processor 202 may find all the charging stations in the geographical region 116. Based on the charging request of the user 118, a set of charging stations that may be available for service from 1 PM to 5 PM may be selected. From the selected set of charging stations, the processor 202 may select a charging station. The selection of charging station from the set of charging stations may be based on the requirement (for example, SOC, capacity of a battery unit, type of the battery charging service etc.).

The processor 202 may select the charging station 416 from the plurality of charging stations 106 based on the blocklist information 114 and/or the welcome-list information 115. For example, one or more charging stations from where the vehicle 104 may be ineligible to receive the battery charging service may be determined based on the determined blocklist information 114. Such stations may be filtered out from the plurality of charging stations 106. The vehicle 104 may be eligible to receive the battery charging service from remaining charging stations. From the remaining charging stations, the processor 202 may select a charging station (such as the charging station 416) that meets the requirements (as provided in 402) in the received charging request. The selected charging station 416 may always be different from the one or more charging stations (from where the vehicle 104 may be ineligible to receive the battery charging service). In another example, one or more charging stations from where the vehicle 104 may be eligible to receive the battery charging service may be determined based on the determined welcome-list information 115. Other stations except for the welcome-list charging stations may be filtered out from the plurality of charging stations 106. From the welcome-list charging stations, the processor 202 may select a charging that meets the requirements (as provided in 402) in the received charging request. The selection may be performed further based on the welcome-list information 115.

Additionally, or alternatively, the selection of the charging station 416 may be performed based on the vehicle information in the received charging request or the requirement indicated in the charging request. In an embodiment, the user 118 may be presented with an option to select a charging station from a set of charging stations. An input may be received from the user 118 of the vehicle 104 to select the charging station that the user 118 may prefer to use for charging the battery of the vehicle 104.

In accordance with an embodiment, the processor 202 may select a set of charging stations from the plurality of charging stations 106 based on the availability information and the requirement indicated in the charging request. For example, if the vehicle 104 requires the battery charging service on December 15 in a desired timeslot (i.e., 10 AM to 12 PM) then charging stations available in the desired timeslot for booking the battery charging service may be selected from the plurality of charging stations 106. The charging station 416 may be finally selected from the set of charging stations.

In accordance with an embodiment, the selection of the charging station 416 may be performed based on a user input, a predefined preference of the user 118, or based on a specific metric (e.g., distance, time, rating, area). For example, a station that may be closest in distance to the location of the vehicle 104 may be selected from the set of charging stations. In accordance with an embodiment, the charging station 416 may be selected further based on a determination that an estimated time of arrival (ETA) of the vehicle 104 at a location of the selected charging station 416 is a minimum amongst the plurality of charging stations 106. For example, while travelling from location A (a source location) to location B (a destination location), the vehicle 104 may reach an SOC of 60% and may require the battery charging service near the location B. Based on ETA of the vehicle 104 to charging stations in the location B, the charging station 416 may be selected for the battery charging service.

At 408, a registration operation may be executed. In the registration operation, the processor 202 may register an order to service the charging request with the selected charging station 416. The charging request registration may include vehicle information associated with the vehicle 104. The vehicle information may include a vehicle registration number 408A (such as a registration number of the vehicle 104), a current location 408B (i.e., a geographic location) of the vehicle 104, or user information 408C (for example, user's name, user's contact number, user's unique identification number, and so on) associated with the user 118 of the vehicle 104.

At 410, information associated with the registration may be displayed. The processor 202 may control the display device 102A to render the information associated with the registration. As shown, for example, a confirmation 410A may be displayed on the display device 102A to indicate the registration of the order to service the charging request with the selected charging station 416. The information may also include other details related to the battery charging request. For example, the information may include a rate of charge (in USD) that may be charged by the owner of the selected charging station 416 for the battery charging service by the user 118. The information may also include a payment link to pay for an order to service the charging request. In an embodiment, the payment may be made prior to completion of the battery charging request. In another embodiment, the payment may be made after a completion of the battery charging request. The information may include a payment confirmation based on successful payment of the battery charging request. Additionally, the information may include a location of the selected charge station 416 on map and an option to reschedule a plan for availing the battery charging service.

Figure 5:
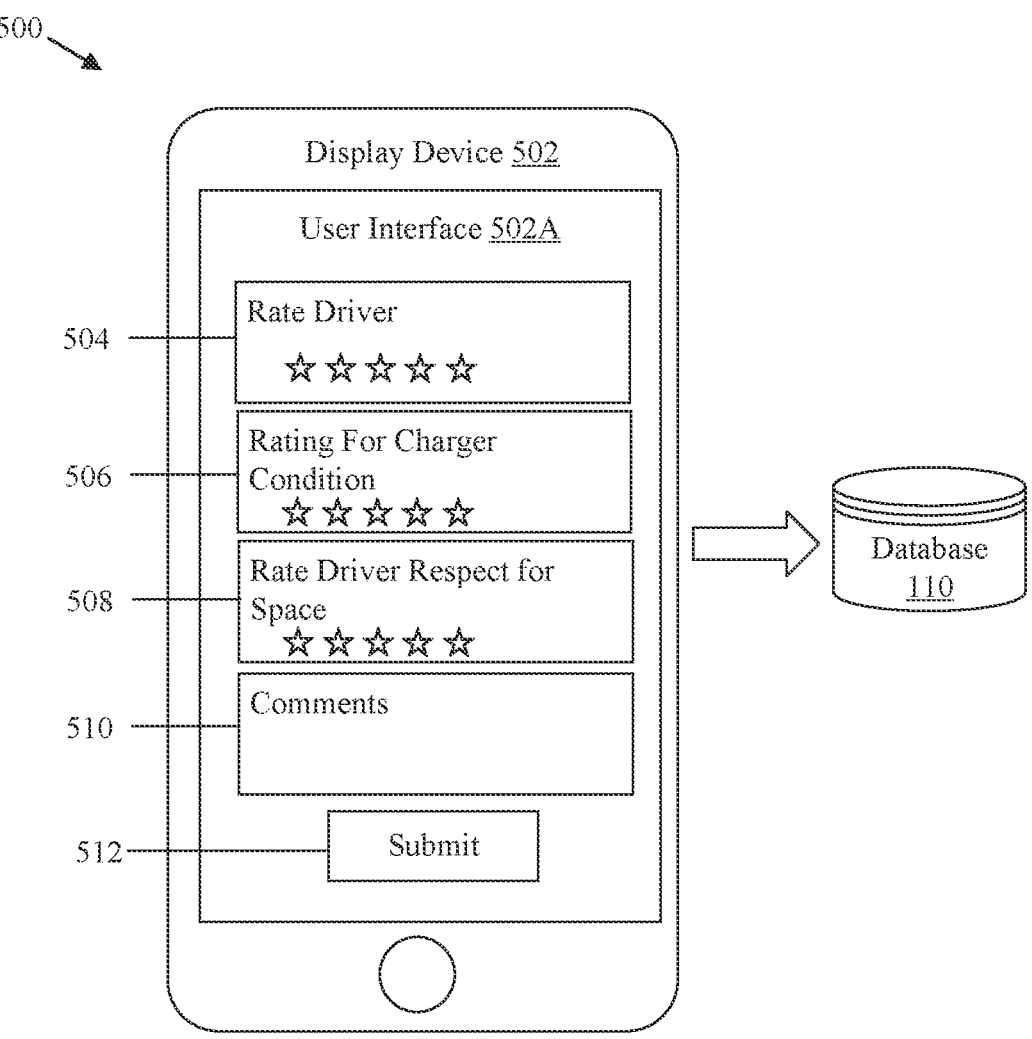
FIG. 5 is a diagram that illustrates an exemplary display device to receive a rating associated with a user of vehicle, in accordance with an embodiment of the disclosure.

FIG. 5 is a diagram that illustrates an exemplary display device to receive a rating associated with a user of the vehicle 104. FIG. 5 is explained in conjunction with elements from FIG. 1, FIG. 2, FIG. 3, and FIGS. 4A and 4B. With reference to FIG. 5, there is shown diagram 500 of a display device 502 with a user interface 502A for receiving a rating associated with the user 118 of the vehicle 104.

During operation, the processor 202 may receive information (e.g., second information) from the display device 502 of an owner of a charging station (from where the vehicle 104 may have received the battery charging service). The second information may indicate a rating associated with the user 118 of the vehicle 104 for a set of past visits to the charging station. As shown, for example, the display device 502 associated with the owner of the charging station may be provided with the user interface 502A to the second information.

The second information may include a driver rating 504. The driver rating 504 may be based on an overall behavior (such as a casual or professional behavior) of the user 118 of the vehicle 104 for a duration of stay at the charging station of the owner. The second information may further include a rating for charger's condition 506 after receiving the battery charging service. For example, if the user 118 is found to have misplaced or poorly handled a charging connector at the charging station, then the owner may provide a poor rating to the user 118 of the vehicle 104. The second information may further include a respect for space 508. The respect for space 508 may be a rating that indicates whether the user 118 of the vehicle 104 performed one or more activities that may be against rules or guidelines set by the owner of the charging station. The second information may further include comments 510. The comments 510 may enable the owner of the charging station to provide a feedback to the user 118 of the vehicle 104. Further, the user interface 502A may include a submit option 512. The owner may select the submit option 512 to submit the second information. After, the submit option 512 is selected by the owner, the second information may be stored in the database 110.

Based on the second information, the processor 202 may compute an overall rating that may be compared with a threshold rating. The blocklist information 114 may be determined further based on whether the overall rating is equal to or below a low threshold rating (e.g., a first threshold rating). The blocklist information 114 may include an identifier of the user 118 as part of a particular blocklist for the charging station based on a determination that the overall rating is equal to or below the low threshold rating. Additionally, or alternatively, the welcome-list information 115 may be determined further based on whether the overall rating is equal to or above a high threshold rating (e.g., a second threshold rating). The welcome-list information 115 may include an identifier of the user 118 as part of a particular welcome-list for the charging station based on a determination that the overall rating is equal to or above the high threshold rating.

FIG. 6 is a flowchart that illustrates exemplary operations for suitable management of charging requests to avoid security issues and servicing delays across charging stations. With reference to FIG. 6, there is shown a flowchart 600. The flowchart 600 is described in conjunction with FIGS. 1, 2, 3, 4A, 4B, and 5. The operations from 602 to 612 may be implemented, for example, by the electronic device 102 of FIG. 1 or the processor 202 of FIG. 2. The operations of the flowchart 600 may start at 602 and proceed to 604.

At 604, a charging request associated with the vehicle 104 may be received. In one or more embodiment, the processor 202 may be configured to receive a charging request associated with the vehicle 104. The charging request may indicate a requirement to provide a battery charging service to the vehicle 104 in the geographical region 116. Details about the charging information reception associated with vehicle 104 are provided, for example, in FIG. 4A (at 402).

At 606, the blocklist information 114 may be determined. The blocklist information 114 may indicate an ineligibility of or access is denied for the vehicle 104 to receive the battery charging service from at least one charging station of the plurality of charging stations 106. In one or more embodiments, the processor 202 may be configured to determine blocklist information 114. Additionally, or alternatively, welcome-list information 115 may be determined and may indicate an eligibility of or access is granted for the vehicle 104 to receive the battery charging service from at least another charging station of the plurality of charging stations 106. Details about the blocklist information 114 and welcome-list information 115 determination are provided, for example, in FIG. 4A (at 404).

At 608, a charging station may be selected from the plurality of charging station 106. In one or more embodiments, the processor 202 may be configured to select the charging station. Details about the charging station selection are provided, for example, in FIG. 4B (at 406).

At 610, an order to service the charging request with the selected charging station may be registered. In one or more embodiments, the processor 202 may register an order to service the charging request with the selected charging station. Details about the registration of an order to service the charging request are provided, for example, in FIG. 4B (at 408)

At 612, the display device 102A may be controlled to render information associated with the registration. In one or more embodiments, the processor 202 may control the display device 102A to render information associated with the registration. Control may pass to end.

Various embodiments of the disclosure may provide a non-transitory, computer-readable medium and/or storage medium, and/or a non-transitory machine readable medium and/or storage medium stored thereon, a set of instructions executable by a machine and/or a computer (such as the electronic device 102). The set of instructions may be executable by the machine and/or the computer to perform operations that may include receiving a charging request associated with the vehicle 104. The charging request may indicate a requirement to provide a battery charging service to the vehicle 104 in the geographical region 116 that includes the plurality of charging stations 106. The operations may include determining the blocklist information 114 that indicates ineligibility of or access is denied for the vehicle 104 to receive the battery charging service from at least one charging station of the plurality of charging stations 106. The operations may include selecting a charging station from the plurality of charging stations 106 based on the blocklist information 114. Additionally, or alternatively, the operations may include determining the welcome-list information 115 that indicates eligibility of or access is always granted for the vehicle 104 to receive the battery charging service from at least another charging station of the plurality of charging stations 106. The operations may include selecting a charging station from the plurality of charging stations 106 based on the welcome-list information 115. Thereafter, the operations may include registering an order to service the charging request with the selected charging station and controlling a display device 102A to render information associated with the registration.

The present disclosure may be realized in hardware, or a combination of hardware and software. The present disclosure may be realized in a centralized fashion, in at least one computer electronic device, or in a distributed fashion, where different elements may be spread across several interconnected computer electronic devices. A computer electronic device or other apparatus adapted for carrying out the methods described herein may be suited. A combination of hardware and software may be a general-purpose computer electronic device with a computer program that, when loaded and executed, may control the computer electronic device such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer electronic device is able to carry out these methods. Computer program, in the present context, means any expression, in any language, code or notation, of a set of instructions intended to cause an electronic device with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. A computer-implemented method, comprising:
electronically receiving a charging request associated with a vehicle, wherein the charging request indicates a requirement to provide a battery charging service to the vehicle in a geographical region that includes a plurality of charging stations;
electronically determining at least one of blocklist information or welcome-list information, wherein the blocklist information indicates ineligibility of the vehicle to receive the battery charging service from at least one charging station of the plurality of charging stations, and the welcome-list information indicates eligibility of the vehicle to receive the battery charging service from at least another charging station of the plurality of charging stations;
electronically selecting a charging station from the plurality of charging stations based on the at least one of the blocklist information or the welcome-list information, wherein the selected charging station is different from the at least one charging station, from which the vehicle is ineligible to receive the battery charging service;
electronically registering an order to service the charging request with the selected charging station; and
electronically controlling a display device to render information associated with the registration.

2. The computer-implemented method according to claim 1, wherein the requirement comprises at least one of: a current state of charge (SOC) of the vehicle, a period for which the vehicle requires the battery charging service, a capacity of a battery unit of the vehicle, or a type of the battery charging service that is required for the vehicle.

3. The computer-implemented method according to claim 2, wherein the charging station is selected further based on the requirement.

4. The computer-implemented method according to claim 1, wherein the charging request includes vehicle information associated with the vehicle, and the vehicle information comprises at least one of: a vehicle registration number, a current location of the vehicle, or user information associated with a user of the vehicle.

5. The computer-implemented method according to claim 4, wherein the charging station is selected further based on the vehicle information.

6. The computer-implemented method according to claim 1, further comprising electronically acquiring first information about a location associated with each charging station of the plurality of charging stations, wherein the first information indicates a type of the location and at least one restriction associated with the location, and the blocklist information is determined further based on the acquired first information.

7. The computer-implemented method according to claim 1, further comprising electronically acquiring second information that indicates a rating associated with a user of the vehicle for a set of past visits to the at least one charging station, wherein the blocklist information is determined further based on whether the rating is equal to or below a first threshold rating, and the welcome-list information is determined further based on whether the rating is equal to or above a second threshold rating.

8. The computer-implemented method according to claim 1, further comprising:

electronically receiving availability information that comprises a plurality of timeslots corresponding to the plurality of charging stations, wherein each timeslot of the plurality of timeslots indicates a period for which a corresponding charging station of the plurality of charging stations is available to service one or more charging requests; and electronically selecting a set of charging stations from the plurality of charging stations based on the availability information and the requirement indicated in the charging request, wherein the charging station is selected from the set of charging stations.

9. A non-transitory computer-readable medium having stored thereon, computer-executable instructions which, when executed by an electronic device, cause the electronic device to execute operations, the operations comprising:

receiving a charging request associated with a vehicle, wherein the charging request indicates a requirement to provide a battery charging service to the vehicle in a geographical region that includes a plurality of charging stations;

determining at least one of blocklist information or welcome-list information, wherein the blocklist information indicates ineligibility of the vehicle to receive the battery charging service from at least one charging station of the plurality of charging stations, and the welcome-list information indicates eligibility of the vehicle to receive the battery charging service from at least another charging station of the plurality of charging stations;

selecting a charging station from the plurality of charging stations based on the at least one of the blocklist information or the welcome-list information, wherein the selected charging station is different from the at least one charging station, from which the vehicle is ineligible to receive the battery charging service; and registering an order to service the charging request with the selected charging station; and controlling a display device to render information associated with the registration.

* * * * *